3,232,870
PROCESS OF DRILLING A WELL
Jack C. Cowan, Augustus Earl Beasley, Jr., Robert O. Stearns, John W. Jordan, and Claude Malcolm Finlayson, all of Houston, Tex., assignors to National Lead Company, New York, N.Y., a corporation of New Jersey
No Drawing. Filed Dec. 17, 1962, Ser. No. 244,905
3 Claims. (Cl. 252—8.5)

This invention relates to well-working fluids, such as drilling fluids for use in drilling oil and gas wells, well-packing fluids, well-fracturing fluids and the like, and more particularly to an improved oil-base type of well-working fluid.

In drilling wells for oil and gas by the rotary method, it is common to use a circulating fluid which is pumped down to the bottom of the well through a drill pipe, where the fluid emerges through ports in the drilling bit. The fluid rises to the surface in the annular space between the drill pipe and the walls of the hole, and at the surface it is treated to remove cuttings and the like and to prepare it for recirculation into the drill pipe again. The circulation is substantially continuous during a given session of drilling.

While in the earlier days of rotary drilling the circulating fluid was nearly always in the nature of clay and water, sometimes with weighting agents added, in recent years the use of a fluid made up with base liquid of oil instead of water has become commonplace. Such fluids are known as oil base drilling fluids or simply as oil base muds, by an extension of the term originally used for the clay water slurries. Such oil base muds may indeed have some water as part of their composition, but when that is the case, the water is present in an emulsified state and the continuous phase of the system is still oil.

Oil base muds have further important uses in petroleum drilling and producing techniques. For example, they may be used as packer fluids between the casing and the walls of the bore hole. In some areas, notably in the Long Beach and Wilmington fields in Southern California and indeed elsewhere, the space to be filled is very large since a portion of the hole may have been deliberately greatly enlarged in passing through zones subject to horizontal shear during earthquakes. Again, after the producing formation has been reached by the drilling operation, it is often fractured by imposed hydrostatic pressure in order to give greater effective permeability for the oil and gas to be produced. In such instances, oil base fluids of the same general type are widely used. Since oil base fluids for these several usages may all have approximately the same composition, it is convenient and suitable to describe them as well-working fluids, indeed as a well recognized class in the art concerned.

An important feature of well-working fluids of the class described and especially of oil base well-working fluids is their ability to resist filtration. In most instances when they are in actual use, whether as drilling fluids, packer fluids or fracturing fluids, the well-working fluid is in contact with a more or less permeable formation, such as, for example, sandstone, sandy shale and the like, with an effective balance of pressure such that the fluid tends to be forced into the permeable formation. This is, for example, the normal state of affairs in drilling a well, since one of the functions of the drilling fluid is to keep all of the formations and formation fluids in place by superior hydrostatic pressure during the drilling operation. Again, when these fluids are used as packer fluids, it is desirable and generally necessary to keep formation fluids, which may be salt water, corrosive oil and gas and the like, from entering the space filled by the fluid. Finally, when well-working fluids are used for fracturing operations, the hydrostatic pressure of the fluid in contact with the formation is especially great, and the formation surfaces to be protected from filtration are especially critical, since they include great areas along fracture planes.

When a well-working fluid is deficient in its ability to resist filtration, then the solids in the fluid are held back by the permeable formation and build up as a filter cake or sludge on its surfaces, while the liquid per se of the well-working fluid filters into the permeable formation. The filter cake or sludge thus formed is generally very undesirable. In drilling operations it gradually diminishes the effective working diameter of the hole and eventually may lead to stuck drill pipe and similar problems. In packer use, filtration must be avoided and indeed substantially reduced to zero, for otherwise the packer fluid will gradually disappear from the space to be protected, its place most generally being taken then by lighter fluids intruding from above. In fracturing use, the filter sludge on the faces of the oil-bearing formation which are opened up by the fracturing processes can be completely fatal to the subsequent production of oil from the fracture zone.

As the depths to which wells are drilled in search of oil and gas gradually become greater, as has been the case from the very beginning of the oil industry, the temperatures necessarily become greater as well and the problem of providing a well-working fluid which resists filtration even at high temperatures has become more and more difficult to solve.

An object of our invention is to provide an oil-base well-working fluid having a reduced filtrability.

Another object of our invention is to provide a method of modifying lignosulfonates so that they may be used in oil-base well-working fluids.

Another object of our invention is to provide an oil-base well-working fluid having low filtrability in which said low filtrability is especially resistant to deterioration at high temperature.

Another object of our invention is to provide a method of drilling wells by the rotary method incorporating an oil-base drilling fluid in which said fluid is maintained in a state of low filtrability.

Other objects of our invention will appear as the description thereof proceeds.

Generally speaking, and in accordance with an illustrative embodiment of our invention, we incorporate into an oil-base well-working fluid a significant amount of an alkyl ammonium lignosulfonate having a hydrocarbon chain of between 12 to 22 carbon atoms in a straight chain. The well-working fluid may of course contain additives, such as weighting materials, water, thickeners of various kinds, dispersing agents, and the like. These terms will be explained and exemplified in portions of the disclosure which follows.

Lignosulfonates are salts of lignosulfonic acid, which is a material formed when the lignin of wood is solubilized by the sulfite process of pulp manufacture. Lignosulfonates are a common and important article of commerce, and are available in large quantity in the form of their simple salts, such as sodium, calcium, ammonium, and mixtures thereof. Generally we prefer to work with a commercially purified lignosulfonate, several of which are commercially available as the end result of various processes. In the waste sulfite liquor of which the lignosulfonates form the most valuable constituents, there are generally also other non-lignosulfonate by-constituents, chiefly wood sugars and in some cases also inorganic salts. Lignosulfonates which have been purified by the well known Howard process are readily available: this process involves fractional precipitation of the lignosulfonates using calcium ion and controlled pH to yield a well-purified product. Purified lignosulfonates are also available as the residue from the fermentation of the wood sugars in whole sulfite liquor to produce alcohol. More recently, lignosulfonates purified by ion exchange have been made available. All of these are well suited for our use. Of course, the whole waste sulfite liquor, sugar and all, may be used as a starting material, and in this case due regard must be given in the stoichiometric computations for the presence of the wood sugar diluent. Generally speaking, we prefer a reasonably well cleaned-up lignosulfonate, since the wood sugars which otherwise would be present do not benefit the final product and in fact appear to have a deleterious effect in some cases. The commercially available and suitable lignosulfonates are water-soluble.

In order to make an alkyl ammonium lignosulfonate for use in our invention we simply replace by metathesis the sodium, calcium, or ammonium ion present in the starting lignosulfonate material with an alkyl ammonium ion, the latter possessing a hydrocarbon chain of between 12 and 22 carbon atoms in a straight chain. Since these alkyl ammonium lignosulfonates are not soluble in water, their production is quite simple. Thus, we may, for example, add an aqueous solution of an alkyl ammonium salt, e.g., octadecyl ammonium chloride, to an aqueous solution of a lignosulfonate, e.g., sodium lignosulfonate, whereupon the octadecyl ammonium lignosulfonate will be precipitated leaving the metathetical sodium chloride in solution. The alkyl ammonium lignosulfonate may be recovered by filtration followed by drying and grinding, or its recovery may be accomplished by the so-called flushing technique which involves the addition of some oily substance such as, for example, diesel oil, to the reaction mixture just described, whereupon the alkyl ammonium lignosulfonate collects in the oily layer or phase and may be readily separated.

By the term "alkyl ammonium . . . having a hydrocarbon chain of between 12 and 22 carbon atoms in a straight chain" we mean to include any substituted ammonium ion in which at least one long carbon chain is present, including not only substituted ammonium strictly speaking, but also substituted polyamines, such as diethylene triamine, tetraethylene pentamine, and the like; and heterocyclic nitrogen bases, such as pyridinium, imidazolinium, morpholinium, and the like.

Thus, the long hydrocarbon chains having between 12 and 22 carbon atoms may be chosen from the following, the listing which follows being illustrative and not exhaustive:

LIST A

Lauryl ($n$—$C_{12}H_{25}$) (dodecyl)
Myristyl ($n$—$C_{14}H_{29}$) (tetradecyl)
Cetyl ($n$—$C_{16}H_{33}$) (hexadecyl)
Margaryl ($n$—$C_{17}H_{35}$) (heptadecyl)
Stearyl ($n$—$C_{18}H_{37}$) (octadecyl)
Arachidyl ($n$—$C_{20}H_{41}$) (eicosyl)
Behenyl ($n$—$C_{22}H_{45}$) (docosyl)
Oleyl ($n$—$C_{18}H_{35}$)
Arachidonyl ($n$—$C_{20}H_{39}$)
2-ethyloctadecyl ($C_{20}H_{41}$)

Similarly, the alkyl ammonium ions may be selected from the following list, in which "R" is meant to indicate a long chain alkyl of the type which may be selected from the list just given hereinabove.

LIST B $RNH_3^+$
$R_2NH_2^+$
$R_3NH^+$
$RCH_3NH_2^+$
$R_2(CH_3)_2N^+$
$RC_6H_5(CH_3)_2N^+$
$R_2C_6H_5C_2H_5N^+$
$R(CH_3)_2N^+C_2H_4N^+(CH_3)_2R$

We prefer to produce an alkyl ammonium lignosulfonate by metathesis such that the alkyl ammonium ion present is substantially an equivalent of the lignosulfonate ion present. The base-combining capacity of the lignosulfonate starting material, i.e., its equivalent weight, may be readily determined by standard simple chemical methods and in general will be available from the manufacturer or purveyor thereof. The corresponding equivalent weight of the alkyl ammonium material may likewise be readily determined and generally will be available from the manufacturer.

By our description of the formation of the alkyl ammonium lignosulfonate by metathesis we naturally do not mean to exclude its production by neutralization of the free organic base with the free lignosulfonic acid. Thus, for example, octadecylamine may be caused to react directly with lignosulfonic acid. In general, this is not quite as convenient to carry out as precipitation by adding the respective salts, since the use of a non-aqueous solvent, such as acetone or diethylene glycol, is often necessary in order to obtain complete reaction.

For the most part, the alkyl ammonium lignosulfonates which we use may be prepared in the form of dry powders. These may be added as such to the well-working fluids. If desired, they can be pre-mixed with other dry powders, such as powdered weighting materials of the type commonly used in well-working fluids or other dry additives therefor. Also, it is often convenient to add an oil of the type to be used therein or in any event of a type compatible with the oil which forms the principal component of the well-working fluid itself to the reaction mixture in which the alkyl ammonium lignosulfonate is formed in the first place. The latter then collects in the oil which is added, the phenomenon being known as "flushing," and may readily be removed. If the ratio of oil to alkyl ammonium lignosulfonate is high, the material removed will be in liquid or semi-liquid or paste form, all of which are convenient for addition to the well-working fluid. If the ratio is low, material will be removed which can be conveniently handled by ordinary pelletizing, drying and grinding procedures to give a granular or powdered material, as desired. Other dry additives may be added even when the flushing technique just described is used. Thus, for example, powdered limestone may be added with the oil which collects the alkyl ammonium lignosulfonate into a material suitable for further handling.

The oil which forms a continuous phase of the well-working fluid is a petroleum oil, and most generally is an ordinary diesel oil, although it may be rather lighter, such as kerosene; or somewhat heavier, such as fuel oil, or indeed it may simply be a crude oil, topped or untopped. The nature, availability and cost of crude oil from adjacent fields will often be determinative whether it is used or a diesel oil. The same petroleum oils may be used in the flushing technique already described; or indeed a relatively refined oil such as a lubricating oil or even a white oil may be used.

In some cases the sole constituents of the well-working fluid may be simply a petroleum oil and the alkyl ammonium lignosulfonate. The latter may be present from as little as 2 lbs. per barrel to as high as 50 lbs. per barrel. Some of the beneficial effects of the use of the alkyl ammonium lignosulfonate may be observed, such as the effect in reducing filtration, even at the lowest concentration just given. This is especially the case when the alkyl ammonium lignosulfonate is added to the well-working fluids containing other additives, of types to be mentioned hereinbelow.

Frequently the well-working fluids will contain other additives, a common one being water; often present from as little as 2% or 3% by volume to as great as 40% to 60% by volume. It is desirable and common to use a suitable emulsifying agent, which may be the calcium salt of an inexpensive fatty acid, e.g., calcium tallate, to emulsify the water in the oil. An important feature of our invention, however, is that the alkyl ammonium lignosulfonates are excellent emulsifying agents for any water which may be present in the well-working fluids. It is important that such water be kept in the form of a good stable water-in-oil emulsion. Indeed, for the most part, when our alkyl ammonium lignosulfonates are used in well-working fluids, even when water is present, other emulsifying agents are not necessary, although of course they can be used.

The presence of water in the well-working fluid serves to increase the density of the fluid somewhat since the water is heavier than the oil used; and it also helps to reduce the filtration. Also it lowers the cost of the well-working fluid which is often an important item when large volumes are used.

The oil phase may also contain various oil-soluble substances of a more or less polar nature, which sometimes have the effect of aiding in the dispersion of the alkyl ammonium lignosulfonate. Such a material is nonyl phenol, an example of its use being given hereinbelow.

Weighting materials are quite common in well-working fluids, perhaps the commonest being finely ground limestone. Clay is often used, particularly spent refinery clay, for its hydrophilic character; and barite and celestite are also commonly used. Such mineral weighting materials will be ground to pass 200 mesh, and often to pass 325 mesh.

Some examples showing the results obtainable by proceeding in accordance with our invention will now be given:

Example 1

112 grams of Howard process calcium-sodium lignosulfonate in the form of a fine brown powder was mixed with various amounts of di-(hydrogenated tallow) dimethyl ammonium chloride and 30 grams of water and ground in a hand mortar. The mass thus formed was added to 200 cc. of diesel oil and stirred for 10 minutes in a Waring Blendor. This provided a concentrate which was added to additional diesel oil at two different concentrations of the concentrate, namely, 5 lbs. per barrel (42 U.S. gallons) and 20 lbs. per barrel. The concentrates were dispersed in the batches of diesel oil using a laboratory stirrer. The well-working fluids thus formed were tested for fluid loss by the method standardized by the American Petroleum Institute in Code 29. The results are given in the following tabulation:

|  | Concentrate No. | | | | |
| --- | --- | --- | --- | --- | --- |
|  | 1 | 2 | 3 | 4 | 5 |
| CLS [1] (10.92% moist.) g | 112 | 112 | 112 | 112 | 112 |
| Water, ml | 30 | 30 | 30 | 0 | 30 |
| DHTDMAC,[2] g | 23 (40 me) | 34 (60 me) | 46 (80 me) | 0 | 0 |
| Diesel Oil, ml | 200 | 200 | 200 | 200 | 200 |
| API Filtrate, ml.: | | | | | |
| 5 lb./bbl | 6.7 | 5.6 | 2.6 | | |
| 20 lb./bbl | 1.0 | 0.0 | 0.0 | 200/30 sec. | 200/30 sec. |

[1] Howard process calcium-sodium lignosulfonate.
[2] Di(hydrogenated tallow) dimethyl ammonium chloride (75% active).

The above test results show that the filtration loss of the well-working fluid can be reduced to zero by the A.P.I. test at 20 lbs. of the concentrate per barrel, which corresponds to approximately 8 lbs. of the alkyl ammonium lignosulfonate per barrel, allowing for the oil content of the concentrate itself. The base-combining capacity of the lignosulfonate was found to be 80 millequivalents per 100 grams of dry lignosulfonate, and it will be seen from the results in column 3 that this furnished the lowest filtrate. Columns 4 and 5 show results for blanks containing no alkyl ammonium lignosulfonate, but merely containing the Howard process lignosulfonate by itself with and without water in columns 4 and 5, respectively.

Example 2

Alkyl ammonium lignosulfonates were prepared using a different technique from that described in Example 1. The lignosulfonate was dissolved in 30 times its weight of water, the pH adjusted to 3 with sulfuric acid in the case of samples 2B and 2C, and to 7.5 in the case of sample 2A, the solution heated to 160° F., and the melted ammonium compound added. Flocculation occurred immediately, and when it appeared complete, the alkyl ammonium lignosulfonate was filtered, dried and ground. Subsequently, a quantity of this alkyl ammonium lignosulfonate was moistened with 0.4 of its weight of water and sodium hydroxide was added, the amounts used being 12% by weight in the case of sample 2A and 24% in the case of samples 2B and 2C. These mixtures were ground with a mortar and pestle and dried and ground to powder form and then used to make up an oil base drilling mud by adding 25 grams of the alkyl ammonium lignosulfonate to 295 cc. of diesel oil, together with 270 grams of ground barite weighting material and 10 grams of di-(hydrogenated tallow) dimethyl ammonium attapulgite made in accordance with the teaching of U.S. Patent No. 2,531,427. A separate mud was made for each of the three lignosulfonate preparations; and a blank mud was made up for testing having the same composition as the others but omitting the alkyl ammonium lignosulfonate. The muds were stirred for 20 minutes using a laboratory stirring device and tested in accordance with the procedures of the American Petroleum Institute. The muds were retested the next day after having been rolled at 150° F. for 16 hours, as is usual in drilling mud testing.

These muds had a weight of 12.1 lbs. per gallon. The composition of the samples and the test results are given in the tables which follow:

Sample No.: Composition
- 2A_____. 100 gm. Howard process sodium-calcium lignosulfonate.
  80 gm. soya 1,3 propylene diamine neutralized with 25 gm. glacial acetic acid.
- 2B_____ 100 gm. Howard process sodium-calcium lignosulfonate.
  100 gm. di(hydrogenated tallow) dimethyl ammonium chloride.
- 2C_____ 100 gm. sulfonated alkali lignin ("Polyfon T") sodium lignosulfonate, having 19.7% sodium sulfonate groups.
  100 gm. di(hydrogenated tallow) dimethyl ammonium chloride (75% active).

| Characteristic Determined | Sample No. | | | |
|---|---|---|---|---|
| | 2A | 2B | 2C | Blank |
| Plastic viscosity, cp., before rolling | 15 | 15 | 14 | 13 |
| Plastic viscosity, cp., after rolling | 16 | 18 | 17 | 16 |
| Yield point, lbs./100 ft.$^2$, before rolling | 1 | 0 | 1 | 2 |
| Yield point, lbs./100 ft.$^2$, after rolling | 1 | 0 | 2 | 2 |
| 10 sec. gel, lbs./100 ft.$^2$, before rolling | 0 | 1 | 0 | 1 |
| 10 sec. gel, lbs./100 ft.$^2$, after rolling | 0 | 0 | 1 | 3 |
| 10 min. gel, lbs./100 ft.$^2$, before rolling | 3 | 2 | 5 | 2 |
| 10 min. gel, lbs./100 ft.$^2$, after rolling | 2 | 2 | 3 | 4 |
| API Filtrate, ml., before rolling | 0.0 | 0.0 | 0.0 | 50/10 min. |
| API Filtrate, ml., after rolling | 0.0 | 1.0 | 0.0 | 50/12 min. |
| High temperature, high pressure filtrate, 300° F., 500 p.s.i., after rolling, ml | 9.6 | 12.4 | 8.8 | |

*Example 3*

This example shows the preparation of the alkyl ammonium lignosulfonate with the employment of a non-aqueous solvent. 50 gms. of a sodium lignosulfonate made by sulfonating alkali lignin (Polyfon R) and having 26.9% sodium sulfonate groups, were dissolved in 500 cc. ethylene glycol, the solution heated to 180° F. and 50 grams of di(hydrogenated tallow) dimethyl ammonium chloride added. Flocculation occurred and the precipitate was filtered, washed with water to remove the solvent, and dried at 190° F. for 16 hours. The product was then dispersed in diesel oil at two different concentrations, namely, 10 and 20 lbs. per barrel, and a blank was made by dispersing the unreacted sodium lignosulfonate in diesel oil at a concentration of 20 lbs. per barrel. The well-working fluids thus formed were tested for fluid loss by the A.P.I. method, with the following results:

| Concentration of amine lignosulfonate, lbs./bbl | 0 | 10 | 20 |
|---|---|---|---|
| A.P.I. Filtrate, ml. (thirty minutes) | 50 ml./30 sec. | 5.4 | 2.2 |

*Example 4*

The alkyl ammonium lignosulfonate obtained by the ethylene glycol method and described hereinabove in Example 3 was also made up into an oil-base drilling fluid using diesel oil, the alkyl ammonium attapulgite described and specified in Example 2 hereinabove, and ground barite weighting material. These muds were first tested after agitating 25 minutes at room temperature and tested again after hot rolling at 150° F. for 16 hours. A mud was made up using the unreacted sodium lignosulfonate in place of the alkyl amine lignosulfonate. The results obtained are given in the table which follows:

| | Inventive Mud | "Blank" Mud |
|---|---|---|
| Diesel oil, ml | 295 | 295 |
| Alkyl ammonium lignosulfonate, gm | 25 | |
| Sodium-calcium lignosulfonate, gm | | 25 |
| Alkyl ammonium attapulgite, gm | 10 | 10 |
| Ground barite, gm | 270 | 270 |
| Plastic viscosity, before rolling, cp | 16 | 13 |
| Plastic viscosity, after rolling, cp | 17 | 16 |
| A.P.I. Filtrate, before rolling, cc | 0.0 | 50/10 min. |
| A.P.I. Filtrate, after rolling, cc | 0.0 | 50/12 min. |

*Example 5*

In this series of tests, Howard process sodium calcium lignosulfonate was reacted with various alkyl ammonium compounds by the following general procedure.

The lignosulfonate was dissolved in 3 liters of water, heated to 180° F., the pH adjusted by the addition of the sulfuric acid, the alkyl ammonium salt brought to 180° F. and then added to the aqueous solution of the lignosulfonate. Flocculation occurred immediately in all cases and after standing 15 minutes, the solution was filtered, and the precipitate was dried for 16 hours at 212° F. and ground to a fine powder in a laboratory hammer mill. The following table shows the weight of sodium calcium lignosulfonate used per 3 liters of water, as well as the weight and description of the alkyl ammonium compound; and the pH to which the lignosulfonate solution was adjusted prior to the addition of the alkyl ammonium compound.

| Sample No. | Gms. Lignosul. | Gms. Alkyl Ammonium Compound | pH | Description of Alkyl Ammonium Codmpoun |
|---|---|---|---|---|
| 5A | 300 | 300 | 3.5 | Stearyl amine. |
| 5B | 250 | 375 | 3 | Distearyl amine. |
| 5C | 300 | 300 | 3 | Octadecyl dimethyl amine. |
| 5D | 250 | 200 | 7.5 | Tallow 1,3 propylene diamine plus 60 g. glacial acetic acid. |
| 5E | 200 | 400 | 3 | Stearyl trimethyl ammonium chloride. |
| 5F | 200 | 200 | 3 | Di(hydrogenated tallow) dimethyl ammonium chloride. |
| 5G | 200 | 300 | 3 | Tri(hydrogenated tallow) methyl ammonium chloride. |

The alkyl ammonium lignosulfonates produced as described hereinabove were next added to a mixture of 95% diesel oil and 5% nonyl phenol, at concentrations of 10 and 20 lbs. per barrel. A blank was also made up using the unreacted sodium calcium lignosulfonate at 20 lbs. per barrel. The inventive well-working fluids thus formed were found to have low filter losses when tested by the A.P.I. method and more particularly as shown in the table which follows:

| Additive | A.P.I. Fluid Loss | |
|---|---|---|
| | 10 lb./bbl. | 20 lb./bbl. |
| 5A | 3.0 | 1.0 |
| 5B | 10.0 | 3.4 |
| 5C | 2.2 | 0.5 |
| 5D | 0.7 | 0.2 |
| 5E | 1.0 | 0.1 |
| 5F | 3.6 | 0.9 |
| 5G | 2.6 | 1.2 |
| SCLS [1] Blank | | 50/30 sec. |

[1] Sodium calcium lignosulfonate, blank.

The alkyl ammonium lignosulfonates just described were further tested by making them up into oil base drilling muds, using the same alkyl ammonium clay described in Example 2 hereinabove. These muds were tested both before and after hot rolling overnight, as has already been described. The test results obtained are given in the table which follows:

incorporated as a dispersed emulsified phase. Mixing was done in the usual fashion with a laboratory high-speed mixer. A commercially prepared emulsifying agent was used which was essentially the oxidized tall oil-lime-calcium chloride mixture of the solid components of Example 1 of Watkins Canadian Patent No. 578,338; this is identified in the table which follows as "Oxid. tall oil mix." A blank, or control mud was prepared in which the alkyl ammonium lignosulfonate was omitted.

OIL BASE MUDS OF EXAMPLE 5

| Additive | 5A | 5B | 5C | 5D | 5E | 5F | Nil | Nil |
|---|---|---|---|---|---|---|---|---|
| Gms. additive | 20 | 30 | 20 | 20 | 20 | 20 | | |
| Gms. nonyl phenol | 3 | 5 | 3 | 3 | 3 | 3 | 3 | 5 |
| Gms. alkyl ammonium clay | 10 | 15 | 10 | 10 | 10 | 10 | 10 | 10 |
| Gms. barite wt. material | 270 | 270 | 270 | 270 | 270 | 270 | 270 | 270 |
| Ml. diesel oil | 295 | 295 | 295 | 295 | 295 | 295 | 295 | 295 |
| Plastic viscosity [1] | 17 | 20 | 13 | 12 | 13 | 12 | 12 | 13 |
| Plastic viscosity [2] | 15 | 19 | 14 | 16 | 15 | 14 | 13 | 14 |
| Yield point [1] | 4 | 2 | 2 | 0 | 1 | 0 | 1 | 1 |
| Yield point [2] | 4 | 6 | 0 | 1 | 1 | 1 | 2 | 3 |
| A.P.I. Filtrate [1] | 0.2 | 0.5 | 0.0 | 0.0 | 0.0 | 0.0 | 50/12 | 50/10 |
| A.P.I. Filtrate [2] | 0.8 | 0.9 | 0.0 | 0.0 | 0.9 | 0.7 | 50/13 | 50/14 |
| High temp., press. loss | 16.8 | 20.0 | 16.0 | 16.0 | 64.0 | 50.0 | ([3]) | ([3]) |

[1] After initial mixing.
[2] After overnight hot rolling.
[3] Too high for testing.

In the above table, following the designation of the additive in accordance with the information already given, the compositions of the various test muds are given. The alkyl ammonium clay is the same as that described hereinabove in connection with Example 2, and is specifically a di(hydrogenated tallow) dimethyl ammonium attapulgite. The last two columns in the table show blank muds, in which none of the alkyl ammonium lignosulfonate additive was included. All of the muds shown in this table have a density or "weight" of substantially 12.0 lbs. per gallon.

It will be seen that treatment of the blank muds with the various additives has scarcely any noteworthy effect upon the rheological properties of the muds, the plastic viscosity and yield points being of the same order of magnitude both with and without the various additives and both initially and after overnight hot rolling. A startling reduction in filtrate values may be seen, however, resulting from the inclusion of the alkyl ammonium lignosulfonate. The figures for A.P.I. filtrate for the two blank muds are in terms of 50 ml. for 12 minutes, 50 ml. for 10 minutes, etc. However, the same test values for the muds including the additive are all less than 1 ml. for the 30 minute A.P.I. test.

As is well known, and indeed as has been previously mentioned, it is most difficult to produce a satisfactory oil-base mud having good rheological properties and yet exhibiting a satisfactorily low filter loss when tested at high temperatures and high pressures. The last line of the above table gives these figures for the several muds under test conditions of 300° F. and a 500 lbs. per square inch pressure differential. Even the worst of the muds containing the additives gave filter losses under these conditions of 50 and 64 ml., which is quite satisfactory. (In comparing filter losses at room temperature and 100 p.s.i. with those at high temperatures and high pressures, not only must the greater effectiveness of the pressure differential but also the greatly lowered viscosity of the fluid phase undergoing filtration, which in this case is oil, be allowed for.) The blank muds had such high filter losses that they could not be tested. 50 ml. of filtrate would be run through a period of time of one to two minutes or even less so that no test figures appear for the blank muds for this particular characteristic.

Next, some oil-base emulsion muds were made up using two of the same alkyl ammonium lignosulfonates already described. The same alkyl ammonium clay was used as in Example 2, and a substantial proportion of water was

INVERTED OIL-BASE EMULSION MUDS OF EXAMPLE 5

| Additive | 5A | 5F | Nil |
|---|---|---|---|
| Gms. additive | 10 | 20 | |
| Gms. alkyl ammonium clay | 2 | 2 | 2 |
| Gms. oxid. tall oil mix | 15 | 20 | 20 |
| Gms. barite wt. material | 236 | 236 | 236 |
| Ml. diesel oil | 177 | 177 | 160 |
| Ml. water | 118 | 118 | 118 |
| Plastic viscosity [1] | 52 | 51 | 43 |
| Plastic viscosity [2] | 61 | 66 | 52 |
| Initial gel [1] | 6 | 11 | 0 |
| Initial gel [2] | 6 | 6 | 0 |
| 10-minute gel [1] | 18 | 12 | 5 |
| 10-minute gel [2] | 12 | 7 | 0 |
| A.P.I. Filtrate [1] | 0 | 0 | 0 |
| A.P.I. Filtrate [2] | 0 | 0 | 0 |
| High temp., pressure loss | 2.2 | 2.2 | ([3]) |

[1] After initial mixing.
[2] After overnight hot rolling.
[3] 25 oil, plus 10 water.

The blank mud did not settle (nor did the others), and was an apparently stable emulsion, which may be attributed to the oxidized tall oil emulsifying agent present. However, the test results show clearly how the blank mud broke in the high temperature, high pressure filtration test (300° F., 500 p.s.i.), the fluid lost consisting of 25 ml. oil and 10 ml. water. In contrast, the muds containing the alkyl ammonium lignosulfonate additive were extremely stable under this test, and lost only 2.2 ml. of oil filtrate.

*Example 6*

In this series of tests, various sulfonated alkali lignins were made into their di(hydrogenated tallow) dimethyl ammonium salts by grinding together in a mortar quantities of the sulfonated lignin, di(hydrogenated tallow) dimethyl ammonium chloride, and water. This procedure formed the alkyl ammonium lignosulfonate, and the reaction mixture was then put in a Waring Blendor with roughly twice its volume of diesel oil and agitated for ten minutes, to form a readily handled concentrate. These concentrates were then dispersed in further quantities of diesel oil at concentrations of 5 and also 20 pounds per barrel, and the filter losses of the well-working fluids thus formed were determined in accordance with the A.P.I. procedure.

The compositions of the concentrates as well as the filter losses are given in the tabulation which follows:

| Concentrate No. | 6A | 6B | 6C | 6D | 6F | 6G | 6H | 6I |
|---|---|---|---|---|---|---|---|---|
| Percent sodium sulfonate in starting lignosulfonate | 32.8 | 32.8 | 26.9 | 26.9 | 10.9 | 19.7 | 19.7 | 19.7 |
| Designation as "Polyfon" | F | F | R | R | O | O | T | T |
| Gms. Polyfon | 106 | 106 | 106 | 107 | 107 | 107 | 106 | 106 |
| Gms. DHTDMAC | 23 | 46 | 23 | 46 | 23 | 46 | 23 | 46 |
| Gms. water | 24 | 34 | 33 | 33 | 33 | 33 | 33 | 33 |
| CC diesel oil | 200 | 200 | 200 | 200 | 200 | 200 | 200 | 200 |
| Filter losses of well-wirking fluids: | | | | | | | | |
| At 5 lbs./bbl | 4.0 | 6.0 | 4.0 | 4.0 | 7.0 | 8.5 | 3.0 | 11.0 |
| At 20 lbs./bbl | 1.0 | 2.0 | 0.9 | 1.1 | 4.0 | 3.0 | 2.0 | 2.8 |

It will be seen from the above table that the best results were obtained from the more fully sulfonated lignins. Even so, however, usable well-working fluids were obtained with the alkyl ammonium lignosulfonate which had the lowest degree of sulfonation, although it would not be economical to use this particular one when such better ones are available. Polyfon R gave especially good results.

Blank test fluids were made up with Polyfons, water and diesel oil without the alkyl ammonium salt, with the Polyfons present at 5 and 20 lbs. per barrel. The filter losses were too high for accurate measurement, 100 ml. filtrate appearing in two minutes or less. The excellent results obtained by proceeding in accordance with the invention may therefore be seen from the above results.

It is to be understood that our invention contemplates the addition to the well-working base fluid of an already reacted alkyl ammonium lignosulfonate. It may be stated that as a general proposition it is not possible to achieve the objects of our invention by adding the inorganic cation lignosulfonate salt to the well-working fluid and separately adding thereto a salt of the alkyl ammonium ion, or indeed, of a free organic base. In the first place, the reaction which provides the alkyl ammonium lignosulfonate by metathesis is after all the reaction of two high molecular weight organic ions, and the conditions must be propitious for the metathesis to take place. It does indeed take place readily enough in the various fashions already described hereinabove, wherein the concentrations of the reactants are fairly high. However, if the lignosulfonate, such as, for example, calcium or sodium lignosulfonate, is added to the well-working base fluid, if the latter is entirely oil with no water phase present, then the lignosulfonate will be insoluble therein and the likelihood of subsequent reaction with an alkyl ammonium salt is practically nil, because the two reactants will not be brought together in a mutually compatible liquid. Where a water phase is present, this will be discontinuous, since as already stated, our invention contemplates and is directed to well-working fluids in which the continuous phase is oil. Here the only practical way of insuring that the alkyl ammonium lignosulfonate will be formed is to add the two reactants together to the water phase before it is incorporated in the well-working fluid, which amounts to prereacting the alkyl ammonium lignosulfonate.

Howard process lignosulfonates have been shown in some of the foregoing examples. This material is widely used in water base drilling fluids, and while it is generally referred to in drilling mud technology as calcium lignosulfonate, there is actually somewhat more sodium than calcium present, so that it can with equal accuracy be termed a sodium calcium lignosulfonate or a calcium sodium lignosulfonate and indeed these designations have been used herein. In the Howard process lignosulfonate used in the examples herein, the actual content of sodium as $Na_2O$ is 8.1%, and of calcium as $CaO$ is 3.5% by weight. Its pH is about 8½, and it is completely soluble in water.

The designation "hydrogenated tallow" refers to the long hydrocarbon chains obtainable by hydrogenating tallow fatty acids. After hydrogenation, these are approximately 64% straight chain $C_{18}$, that is, octadecyl, and approximately 30% of the closely related straight chain $C_{16}$, that is, hexadecyl. In order to simplify the terminology herein, it will therefore be understood that when "octadecyl" is referred to, particularly in the claims which follow, this corresponds in a practical fashion to hydrogenated tallow hydrocarbon chains, since this is the most readily available commercial source of octadetyl radicals.

The barrel used herein is the standard oil field unit of 42 U.S. gallons.

It will be seen that our invention accomplishes its objects. It should moreover be kept in mind that while we have explained our invention in terms of various specific materials, examples, conditions of manufacture, and the like, the invention is a broad one, and numerous variations of detail are possible and contemplated within the broad scope of the invention as defined by the claims which follow.

As will be clear from the foregoing disclosure, the term "alkyl ammonium" as used herein and in the claims which follow refers to a substituted ammonium in which an alkyl radical is a substituent. The term could more properly be written "alkylammonium," but this has not been done for the sake of clarity. Accordingly, the compounds designated by this term are completely different from and must not be confused with such compounds as sodium ammonium lignosulfonate, which is lingosulfonic acid neutralized in part with ammonium ion, that is, $NH_4^+$, and in part with sodium ion. This latter material is an article of commerce, arising from sulfite pulping, wherein ammonium bisulfite is used. It, however, is water-soluble and quite comparable to sodium calcium lignosulfonate.

Having described the invention, we claim:

1. A process of drilling a well by a rotary method in which an oil-base drilling fluid is circulated from the surface of the well down to the bottom of a drilling string and upwardly within the bore hole to the surface, in which the said fluid has a continuous phase of oil, in which an alkyl ammonium lignosulfonate having a hydrocarbon chain of from 12 to 22 carbon atoms in a straight chain is added to said liquid during the course of said drilling so as to reduce the filtrability of said liquid to a predetermined value and to maintain it below said predetermined value by repeated additions during the course of said drilling.

2. The process in accordance with claim 1 in which said alkylammonium lignosulfonate is dioctadecyldimethylammonium lignosulfonate.

3. The process in accordance with claim 2 in which said octadecyl is obtained by hydrogenating the alkyl radicals of tallow.

References Cited by the Examiner

UNITED STATES PATENTS

| | | | |
|---|---|---|---|
| 2,531,812 | 11/1950 | Hauser | 252—8.5 |
| 2,594,302 | 4/1952 | Ehrensperger | 260—124.1 |
| 2,596,843 | 5/1952 | Farris | 252—8.55 |
| 2,675,353 | 4/1954 | Dawson | 252—8.5 |
| 2,850,492 | 9/1958 | Erskine et al. | 260—124 |
| 2,876,197 | 3/1959 | Watkins | 252—8.5 |
| 2,885,360 | 5/1959 | Haden | 252—8.5 |
| 3,108,068 | 10/1963 | Weiss et al. | 252—8.5 |

FOREIGN PATENTS 876,603  9/1961  Great Britain.

JULIUS GREENWALD, *Primary Examiner.*